United States Patent
Wu

(10) Patent No.: US 10,853,702 B2
(45) Date of Patent: Dec. 1, 2020

(54) METHOD AND APPARATUS FOR CHECKOUT BASED ON IMAGE IDENTIFICATION TECHNIQUE OF CONVOLUTIONAL NEURAL NETWORK

(71) Applicant: Yi Tunnel (Beijing) Technology Co., Ltd., Beijing (CN)

(72) Inventor: Yili Wu, Beijing (CN)

(73) Assignee: YI TUNNEL (BEIJING) TECHNOLOGY CO., LTD., Beijing (CN)

( * ) Notice: Subject to any disclaimer, the term of this patent is extended or adjusted under 35 U.S.C. 154(b) by 56 days.

(21) Appl. No.: 16/328,904

(22) PCT Filed: Sep. 8, 2017

(86) PCT No.: PCT/CN2017/100999
§ 371 (c)(1),
(2) Date: Feb. 27, 2019

(87) PCT Pub. No.: WO2019/019291
PCT Pub. Date: Jan. 31, 2019

(65) Prior Publication Data
US 2019/0220692 A1 Jul. 18, 2019

(30) Foreign Application Priority Data
Jul. 24, 2017 (CN) .......................... 2017 1 0607759

(51) Int. Cl.
*G06K 9/62* (2006.01)
*H04N 5/247* (2006.01)
(Continued)

(52) U.S. Cl.
CPC ......... *G06K 9/628* (2013.01); *G06K 9/00624* (2013.01); *G06K 9/32* (2013.01);
(Continued)

(58) Field of Classification Search
None
See application file for complete search history.

(56) References Cited

U.S. PATENT DOCUMENTS

| 5,497,314 A | * | 3/1996 | Novak | ................... A47F 9/046 705/17 |
| 9,928,448 B1 | * | 3/2018 | Merler | ................. H05K 999/99 |

(Continued)

FOREIGN PATENT DOCUMENTS

| CN | 103034839 A | 4/2013 |
| CN | 103729777 A | 4/2014 |

(Continued)

OTHER PUBLICATIONS

International Search Report dated Apr. 25, 2018 in corresponding International Application No. PCT/CN2017/100999, filed Sep. 8, 2017, 10 pages (with English Translation).

*Primary Examiner* — Samah A Beg
(74) *Attorney, Agent, or Firm* — Global IP Counselors, LLP

(57) ABSTRACT

A method includes acquiring a plurality of pictures of a single item to be classified placed on a checkout counter, the plurality of pictures corresponding to a plurality of shooting angles one to one, performing an object detection in each of the pictures to obtain a rectangular area image, the rectangular area image being an image corresponding to a rectangular area containing the item, obtaining a plurality of primary classification results correspondingly, according to the plurality of rectangular area images and a pre-trained first-level classification model, and obtaining a first-level classification result of the plurality of pictures according to the plurality of primary classification results and a pre-trained first-level linear regression model, using the first-level classification result as a first classification result and (Continued)

performing checkout according to the first classification result.

10 Claims, 4 Drawing Sheets

(51) Int. Cl.
 *G06Q 20/20* (2012.01)
 *G06K 9/32* (2006.01)
 *G06K 9/00* (2006.01)
 *G06N 3/08* (2006.01)
 *G06N 3/04* (2006.01)
 *G07G 1/00* (2006.01)

(52) U.S. Cl.
 CPC ............ *G06K 9/3233* (2013.01); *G06K 9/62* (2013.01); *G06K 9/627* (2013.01); *G06K 9/6215* (2013.01); *G06K 9/6269* (2013.01); *G06N 3/04* (2013.01); *G06N 3/08* (2013.01); *G06Q 20/208* (2013.01); *G07G 1/0036* (2013.01); *H04N 5/247* (2013.01)

(56) References Cited

U.S. PATENT DOCUMENTS

| | | | | |
|---|---|---|---|---|
| 10,296,814 | B1* | 5/2019 | Kumar | G06K 9/6202 |
| 2007/0260529 | A1* | 11/2007 | Furuno | G06Q 30/0641 |
| | | | | 705/26.8 |
| 2010/0076867 | A1* | 3/2010 | Inoue | G06F 16/583 |
| | | | | 705/26.1 |
| 2013/0058541 | A1 | 3/2013 | Susaki | |
| 2015/0016712 | A1* | 1/2015 | Rhoads | G06T 17/00 |
| | | | | 382/154 |
| 2015/0149303 | A1* | 5/2015 | Spering | G06Q 50/01 |
| | | | | 705/14.72 |
| 2015/0248589 | A1* | 9/2015 | Broache | G06K 9/6807 |
| | | | | 382/182 |
| 2015/0310601 | A1* | 10/2015 | Rodriguez | G07G 1/0072 |
| | | | | 348/150 |
| 2016/0350336 | A1* | 12/2016 | Checka | G06K 9/4628 |
| 2018/0197218 | A1* | 7/2018 | Mallesan | G06K 17/0022 |
| 2019/0228457 | A1* | 7/2019 | Wu | G06K 9/628 |
| 2019/0236363 | A1* | 8/2019 | Bacelis | G06K 9/00771 |
| 2019/0259015 | A1* | 8/2019 | Jacquet | G06Q 20/202 |
| 2019/0325689 | A1* | 10/2019 | Wu | G06Q 30/0633 |
| 2019/0354770 | A1* | 11/2019 | Darvish | G06K 9/6289 |
| 2020/0082168 | A1* | 3/2020 | Fathi | B64C 39/024 |
| 2020/0089997 | A1* | 3/2020 | Chaubard | G06K 9/3233 |
| 2020/0104594 | A1* | 4/2020 | Zucker | G06K 9/6211 |
| 2020/0126150 | A1* | 4/2020 | Vieville | G06N 3/08 |
| 2020/0134381 | A1* | 4/2020 | Chandra Sekar Rao | G06K 9/6256 |
| 2020/0151692 | A1* | 5/2020 | Gao | G06K 9/00671 |

FOREIGN PATENT DOCUMENTS

| | | |
|---|---|---|
| CN | 104077842 A | 10/2014 |
| CN | 106096932 A | 11/2016 |

* cited by examiner

```
┌─────────────────────────────────────────────────────────────────┐
│ acquiring a plurality of pictures of a single item to be         │──── 201
│ classified placed on a checkout counter, wherein the plurality   │
│ of pictures correspond to a plurality of shooting angles one to  │
│ one                                                              │
└─────────────────────────────────────────────────────────────────┘
                                 │
                                 ▼
┌─────────────────────────────────────────────────────────────────┐
│ performing an object detection in each of the pictures to obtain │──── 202
│ a rectangular area image, wherein the rectangular area image is  │
│ an image corresponding to a rectangular area containing the item │
└─────────────────────────────────────────────────────────────────┘
                                 │
                                 ▼
┌─────────────────────────────────────────────────────────────────┐
│ obtaining a plurality of primary classification results          │
│ correspondingly, according to the plurality of rectangular area  │──── 203
│ images and a pre-trained first-level classification model,       │
│ wherein the pre-trained first-level classification model is a    │
│ model that is constructed by the image identification technique  │
│ of convolutional neural network and trained by all the items in  │
│ the shopping place                                               │
└─────────────────────────────────────────────────────────────────┘
                                 │
                                 ▼
┌─────────────────────────────────────────────────────────────────┐
│ obtaining a first-level classification result of the plurality   │
│ of pictures according to the plurality of primary classification │──── 204
│ results and a pre-trained first-level linear regression model,   │
│ and in case that the first-level classification result indicates │
│ a similar item, performing step 205; otherwise, using the        │
│ first-level classification result as the first classification    │
│ result                                                           │
└─────────────────────────────────────────────────────────────────┘
                                 │
                                 ▼
┌─────────────────────────────────────────────────────────────────┐
│ obtaining a plurality of secondary classification results        │
│ correspondingly, according to the plurality of rectangular area  │
│ images and a pre-trained second-level classification model,      │
│ obtaining a second-level classification result of the plurality  │
│ of pictures according to the plurality of secondary              │──── 205
│ classification results and a pre-trained second-level linear     │
│ regression model, and using the second-level classification      │
│ result as the first classification result, wherein the second-   │
│ level classification model is a model that is constructed by the │
│ image identification technique of convolutional neural network   │
│ and pre-trained by similar items in the shopping place           │
└─────────────────────────────────────────────────────────────────┘
                                 │
                                 ▼
┌─────────────────────────────────────────────────────────────────┐
│ performing checkout according to the first classification result │──── 206
└─────────────────────────────────────────────────────────────────┘
```

Fig.2

METHOD AND APPARATUS FOR CHECKOUT BASED ON IMAGE IDENTIFICATION TECHNIQUE OF CONVOLUTIONAL NEURAL NETWORK

CROSS-REFERENCE TO RELATED APPLICATION

This application is a U.S. National Stage application of International Application No. PCT/CN2017/100999, filed Sep. 8, 2017, which claims priority to Chinese Patent Application No. 201710607759.X, filed Jul. 24, 2017, the contents of each of which are hereby incorporated herein by reference.

BACKGROUND

Field of Invention

The present invention belongs to a technical field of image identification, and in particular relates to a method and apparatus for checkout based on the image identification technique of convolutional neural network.

Background of the Invention

When customers see an item they like or need in shopping places such as supermarkets and restaurants, they need to perform checkout at the checkout counter to get them.

In the prior art, there are two commonly used checkout methods. The first method is a barcode-based checkout method, in which the item is identified by scanning the barcode on the item, and checkout of the identified item is performed. The scanning operation is completed by the cashier or by the customer himself. The method has the following defects. Scanning is troublesome and labor-intensive, and has certain requirements for operation. Generally only one item can be scanned at one time, but multiple items cannot be scanned at the same time, and thus the efficiency is low. The second method is an RFID-based checkout method, in which one small radio-frequency module that does not require a battery is attached to the item, and when the item passes through the checkout counter, the checkout counter transmits a wireless signal to the item, the small radio frequency module receives the signal and then feeds back a signal carrying the ID information of the item to the checkout counter, and then checkout is performed accordingly. This method has the following defects. It is troublesome to attach the small radio-frequency module to each item. If the small radio-frequency module falls off from the item, whether it naturally falls off or is artificially torn off, the corresponding losses will be caused to the merchant. In addition, when the item is a metal item, if RFID is attached thereto, there may be a problem that the signal is shielded.

SUMMARY

In order to at least solve the problems existing in the prior art, in one aspect, the present invention provides a checkout method based on the image identification technique of convolutional neural network, comprising: an acquisition step for acquiring a plurality of pictures of a single item to be classified placed on a checkout counter, wherein the plurality of pictures correspond to a plurality of shooting angles one to one; an object detection step for performing an object detection in each of the pictures to obtain a rectangular area image, wherein the rectangular area image is an image corresponding to a rectangular area containing the item; a first classification step for obtaining a plurality of primary classification results correspondingly, according to the plurality of rectangular area images and a pre-trained first-level classification model, obtaining a first-level classification result of the plurality of pictures according to the plurality of primary classification results and a pre-trained first-level linear regression model, wherein the first-level classification model is a model that is constructed by the image identification technique of convolutional neural network and trained by all the items in the shopping place; a confirmation step for using the first-level classification result as a first classification result; and a checkout step for performing checkout according to the first classification result.

In the above-mentioned checkout method, preferably, after the first classification step and before the confirmation step, the checkout method further comprises: a second classification step for obtaining a plurality of secondary classification results correspondingly, according to the plurality of rectangular area images and a pre-trained second-level classification model, obtaining a second-level classification result of the plurality of pictures according to the plurality of secondary classification results and a pre-trained second-level linear regression model, and using the second-level classification result as the first classification result and performing the confirmation step, in case that the first-level classification result indicates a similar item, wherein the second-level classification model is a model that is constructed by the image identification technique of convolutional neural network and pre-trained by similar items in the shopping place.

In the above-mentioned checkout method, preferably, after the confirmation step and before the checkout step, the checkout method further comprises: determining whether the item in the pictures is consistent with the first classification result, according to the plurality of rectangular area images and a pre-trained support vector machine model corresponding to the first classification result, in case that the item in the pictures is consistent with the first classification result, performing the checkout step; otherwise, reminding a customer that the item is out of stock.

In the above-mentioned checkout method, preferably, one camera is disposed a position just above the item to be classified, so that the item is shot downwards from just above to acquire the picture; and four cameras are disposed around the item to be classified, so that the item is shot obliquely downwards.

In another aspect, the present invention provides a checkout apparatus based on the image identification technique of convolutional neural network, comprising: an acquisition device configured to acquire a plurality of pictures of a single item to be classified placed on a checkout counter, wherein the plurality of pictures correspond to a plurality of shooting angles one to one; an object detection device configured to perform an object detection in each of the pictures to obtain a rectangular area image, wherein the rectangular area image is an image corresponding to a rectangular area containing the item; a first classification device configured to obtain a plurality of primary classification results correspondingly, according to the plurality of rectangular area images and a pre-trained first-level classification model, and obtain a first-level classification result of the plurality of pictures according to the plurality of primary classification results and a pre-trained first-level linear regression model, wherein the first-level classification model is a model that is constructed by the image identification technique of convolutional neural network and trained by all the items in the shopping place; a confirmation device configured to use the first-level classification result as a first classification result; and a checkout device configured to perform checkout according to the first classification result.

In the above-mentioned checkout apparatus, preferably, the checkout apparatus further comprises: a second classification device configured to obtain a plurality of secondary classification results correspondingly, according to the plurality of rectangular area images and a pre-trained second-level classification model, obtain a second-level classification result of the plurality of pictures according to the plurality of secondary classification results and a pre-trained second-level linear regression model, and use the second-level classification result as the first classification result, in case that the first-level classification result indicates a similar item, wherein the second-level classification model is a model that is constructed by the image identification technique of convolutional neural network and pre-trained by similar items in the shopping place; and correspondingly, in case that the first-level classification result indicates a similar item, the checkout device performs checkout according to the second-level classification result obtained by the second classification device; otherwise, the checkout device performs checkout according to the first-level classification result obtained by the first classification device.

In the above-mentioned checkout apparatus, preferably, the checkout apparatus further comprises: a determination device configured to determine whether the item in the pictures is consistent with the first classification result according to the plurality of rectangular area images and a pre-trained support vector machine model corresponding to the first classification result; and a selection module configured to call the checkout device, in case that the item in the pictures is consistent with the first classification result; otherwise, remind a customer that the item is out of stock.

In the above-mentioned checkout apparatus, preferably, the acquisition device is cameras, wherein one camera is disposed a position just above the item to be classified, so that the item is shot downwards from just above to acquire pictures; and four cameras are disposed around the item to be classified, so that the item is shot obliquely downwards.

In another aspect, the present invention provides a checkout apparatus based on the image identification technique of convolutional neural network, comprising: cameras for acquiring a plurality of pictures of a single item to be classified placed on a checkout counter, wherein the plurality of pictures correspond to a plurality of shooting angles one to one; a processor; and a memory that records processor-executable instructions, wherein the processor is configured to perform an object detection in each of the pictures to obtain a rectangular area image that is an image corresponding to a rectangular area containing the item, obtain a plurality of primary classification results correspondingly, according to the plurality of rectangular area images and a pre-trained first-level classification model, obtain a first-level classification result of the plurality of pictures according to the plurality of primary classification results and a pre-trained first-level linear regression model, use the first-level classification result as a first classification result, and perform checkout according to the first classification result, wherein the first-level classification model is a model that is constructed by the image identification technique of convolutional neural network and trained by all the items in the shopping place.

In the above-mentioned checkout apparatus, preferably, the processor is further configured to obtain a plurality of secondary classification results correspondingly, according to the plurality of rectangular area images and a pre-trained second-level classification model, obtain a second-level classification result of the plurality of pictures according to the plurality of secondary classification results and a pre-trained second-level linear regression model, and use the second-level classification result as the first classification result, in case that the first-level classification result indicates a similar item, wherein the second-level classification model is a model that is constructed by the image identification technique of convolutional neural network and pre-trained by similar items in the shopping place; otherwise, use the first-level classification result as the first classification result.

The embodiments of the present invention bring out the following beneficial effects by adopting the above-mentioned technical solutions.

The items can be accurately identified, so as to facilitate the self-service checkout.

BRIEF DESCRIPTION OF THE DRAWINGS

The invention will be explained in more detail hereinafter with reference to the drawings.

FIG. 2 illustrates a schematic flowchart of a checkout method based on the image identification technique of convolutional neural network provided in another embodiment of the present invention.

DETAILED DESCRIPTION OF THE EMBODIMENTS

In order to enable the purposes, technical solutions and advantages of the present invention to be clearer, the embodiments of the present invention will be further described below in detail with reference to the drawings.

Figure 1:
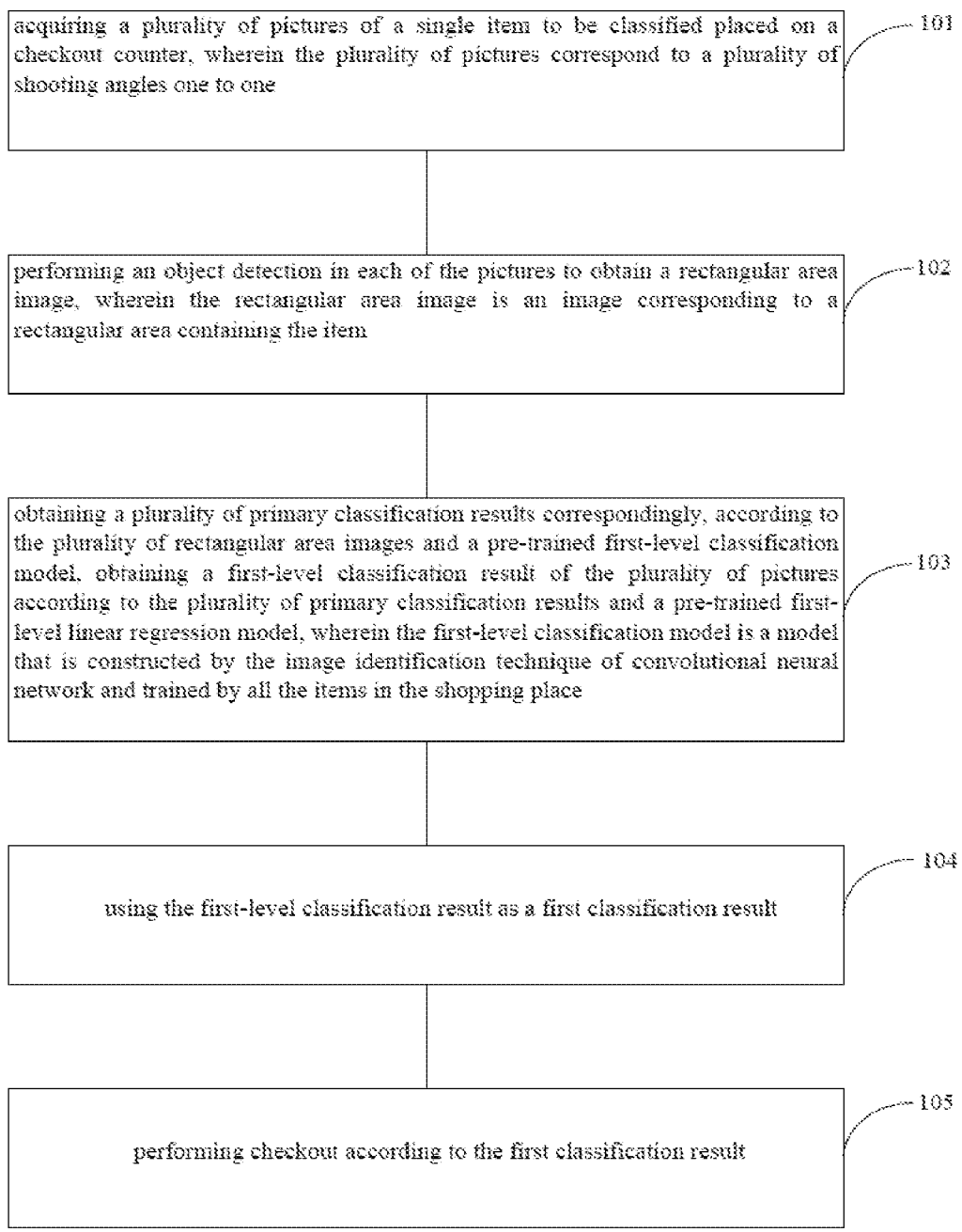
FIG. 1 illustrates a schematic flowchart of a checkout method based on the image identification technique of convolutional neural network provided in an embodiment of the present invention.

Referring to FIG. 1, one embodiment of the present invention provides the checkout method based on the image identification technique of convolutional neural network, comprising:

an acquisition step 101 for acquiring a plurality of pictures of a single item to be classified placed on a checkout counter, wherein the plurality of pictures correspond to a plurality of shooting angles one to one;

an object detection step 102 for performing an object detection in each of the pictures to obtain a rectangular area image, wherein the rectangular area image is an image corresponding to a rectangular area containing the item;

a first classification step 103 for obtaining a plurality of primary classification results correspondingly, according to the plurality of rectangular area images and a pre-trained first-level classification model, obtaining a first-level classification result of the plurality of pictures according to the plurality of primary classification results and a pre-trained first-level linear regression model, wherein the first-level classification model is a model that is constructed by the image identification technique of convolutional neural network and trained by all the items in the shopping place;

a confirmation step 104 for using the first-level classification result as a first classification result;

a checkout step 105 for performing checkout according to the first classification result.

To sum up, it can be known which item is the item by acquiring the plurality of pictures of the single item, processing each of the pictures by using the first-level classification model to obtain a plurality of corresponding classification results and then performing data fusion to the plurality of classification results to output a final result, i.e., processing by using the linear regression model, and thus the accuracy of identifying item is improved.

Referring to FIG. 2, another embodiment of the present invention provides the checkout method based on the image identification technique of convolutional neural network, which comprises the following steps 201 to 207.

In step 201, the plurality of pictures of the single item to be classified placed on the checkout counter are acquired, wherein the plurality of pictures correspond to the plurality of shooting angles one to one.

In this step, one picture can be acquired by taking the picture of the item from a certain shooting angle. Since one shooting angle corresponds to one picture, pictures corresponding to different shooting angles can be acquired by changing different shooting angles. When there are a plurality of shooting angles, a plurality of pictures can be acquired, such that key information for identifying the item can be captured, in which the key information refers to information which plays an important role in identifying (or called as classifying) the item from the appearance of the item. For example, when the item is mineral water, since there are many types of mineral waters, distinguishing from different types of mineral waters mainly depends on a pattern in a circle of plastic paper attached to a mineral water bottle, and this pattern is key information of the mineral waters.

A plurality of cameras, such as five, four or six cameras, are disposed on the checkout counter, so that the plurality of shooting angles are formed, and the number of the cameras is the same as the number of the pictures. The shooting angles of the cameras may be described as follows by using five cameras. One camera is disposed the position just above the item to be classified, so as to take pictures of the item downwards from just above, and four cameras are uniformly disposed around the item to be classified, so as to take pictures of the item obliquely downwards. Alternatively, five cameras are uniformly disposed around the item to be classified, in which two cameras take pictures of the item obliquely upwards, and other three cameras take pictures of the item obliquely downwards. In this embodiment, the number and arrangement of the cameras are not limited. Usually, the more the cameras are, the more the number of the acquired pictures are, the more the information of the item contained in the all pictures is, and thus the classification of the item is facilitated. However, this will increase the hardware complexity and increase the computational amount. Therefore, the number of the cameras may be selected according to the actual situation.

It should be noted that the shooting angles herein may refer one factor of the shooting direction, may also refer to two factors of the shooting direction and shooting distance, and may further refer to other factors or factors in other numbers. In this embodiment, it is not limited.

Acquisition actions (or called as actions for taking pictures) may be triggered by a weighing scale disposed on the checkout counter. For example, the weighing scale is the weighing scale with a pressure sensor and whether to trigger shooting is decided according to a change in weight sensed by the weighing scale. When the weighing scale senses a change in weight and the change has already become stable, the cameras start to take pictures, and thus it can be guaranteed that the required pictures are taken, i.e., pictures are taken at a moment when a customer puts the item on the weighing scale. In other embodiments, actions for taking pictures by the cameras may be triggered by technical means, such as image identification and computer vision. Firstly, cameras continuously observe and shoot an area for placing items, and when it is found that a customer stretches a hand into the place, puts down an item and then takes the hand away, i.e., when such action is captured from a video, an instruction for taking pictures is triggered, i.e., the cameras are triggered to take pictures.

In step 202, the object detection is performed in each of the pictures to obtain the rectangular area image, wherein the rectangular area image is the image corresponding to the rectangular area containing the item.

Specifically, when the object detection is performed in each of the pictures, one rectangular frame (or called as rectangular area) containing the item will be marked out on each of the pictures, the image corresponding to the rectangular frame is the image for classifying the item and it is output to step 203. When the number of the pictures is five, five images corresponding to the rectangular area containing the item will be obtained from the five pictures.

In step 203, the plurality of primary classification results are correspondingly obtained according to the plurality of rectangular area images and a pre-trained first-level classification model, wherein the pre-trained first-level classification model is the model that is constructed by the image identification technique of convolutional neural network and trained by all items in the shopping place.

Specifically, data are collected to establish a data set, and the collecting of the data comprises: 1) shooting all items in the accommodating case from each angle and in each attitude to acquire a great amount of photos; and 2) labeling those photos, i.e., labeling positions, sizes and categories of the items in the photos. The data included in the data set means the above-mentioned photos and labels on those photos. The first-level classification model is a model constructed by the image identification technique of convolutional neural network, and is trained by using the data of all items in the shopping place. The training can be carried out in a gradient descent mode.

The trained first-level classification model classifies the item in each rectangular area image to obtain the primary classification result. The primary classification result is an n-dimensional vector, where n represents the total number of items in a shopping place. Each element in the vector represents a probability that the to-be-classified item belongs to each of the n items according to the first-level classification model. When the element has a maximum value in the vector, it means that the to-be-classified item is an item corresponding to the element according to the model. When there are five rectangular area images, the number of the primary classification results is five n-dimensional vectors.

In step 204, the first-level classification result of the plurality of pictures is obtained according to the plurality of primary classification results and a pre-trained first-level linear regression model, in case that the first-level classification result indicates a similar item, step 205 is performed; otherwise, the first-level classification result is used as the first classification result.

Specifically, in step 203, when the first-level classification model is trained, the primary classification results outputted by the first-level classification model are used as inputs of the first-level linear regression model, and correct classifications of the items included in the pictures corresponding to the primary classification results are used as outputs of the first-level linear regression model, so as to train the first-level linear regression model. The trained first-level linear regression model carries out data fusion on the plurality of primary classification results to obtain one first-level classification result. The first-level classification result represents that the first-level linear regression model predicts to which category of item in the shopping place the item in the picture belongs.

There are various items in the shopping place. Among the various items, there may be some items which are similar in appearance and may easily be visually confused. Such items are called as similar items, e.g., Golden Delicious apples and yellow snowflake pears. If a single to-be-classified item belongs to the similar items, the first-level classification model is difficult to accurately classify the items. For example, Golden Delicious apples are confused with yellow snowflake pears and Golden Delicious apples are classified as yellow snowflake pears. Therefore, the following step 205 needs to be performed. Otherwise, the first-level classification result is directly used as the first classification result for checkout.

In step 205, the plurality of secondary classification results are correspondingly obtained according to the plurality of rectangular area images and the pre-trained second-level classification model, then a second-level classification result of the plurality of pictures is obtained according to the plurality of secondary classification results and the pre-trained second-level linear regression model, and the second-level classification result is used as the first classification result, wherein the second-level classification model is the model that is constructed by the image identification technique of convolutional neural network and trained by the items in a similar item group in the shopping place in advance.

Specifically, the second-level classification model is trained by using data of similar items in the data set established in step 203, and the training may be performed by adopting a gradient descent manner. The second-level classification model differs from the first-level classification model in that different data are used in the training process, wherein the data used by the first-level classification model are data of all the items in the shopping place, and the data used by the second-level classification model are the data of the similar items in the shopping place.

The trained second-level classification model classifies the item in each rectangular area image to obtain the secondary classification result. The secondary classification result is also a m-dimensional vector, and each element in the vector represents a probability that the single to-be-classified item belongs to each of m similar items according to the second-level classification model. When there are five rectangular area images, the number of the secondary classification results is five m-dimensional vectors, where m is smaller than or equal to n and represents the total number of the similar items in the shopping place.

In practice, there are multiple groups of similar items in the shopping place. For example, one group of similar items comprise Golden Delicious apples and yellow snowflake pears, another group of similar items comprise loose-packed salt and loose-packed white sugar, and yet another group of similar items comprise dietary alkali and flour. One second-level classification model can be trained for all the groups of similar items. In order to further improve accuracy of item classification, one second-level classification model is trained for each group of similar items. At this point, if the first-level classification result is similar items, the second-level classification model corresponding to the first-level classification result is called.

When the second-level classification model is trained, the secondary classification results outputted by the second-level classification model are used as inputs of the second-level linear regression model, and correct classifications of the items included in the pictures corresponding to the secondary classification results are used as outputs of the second-level linear regression model, so as to train the second-level linear regression model. The trained second-level linear regression model carries out data fusion on the plurality of secondary classification results to obtain one second-level classification result, and the second-level classification result is used as a first classification result. The second-level classification result represents that the second-level linear regression model predicts to which category of item in the shopping place the item in the picture belongs.

In step 206, checkout is performed according to the first classification result.

After the first classification result is obtained, the item price corresponding to the first classification result is then obtained, thus the cost that the customer needs to pay for the item placed on the checkout counter is determined. The item name, item price and the payment may be displayed through a display on the checkout counter, and the item name may also be reminded to the customer by voice. When the customer pays, the payment can be completed by scanning a two-dimensional code displayed on the display or aligning a two-dimensional code of an account in a mobile terminal to a code scanning terminal on the checkout counter.

Figure 3:
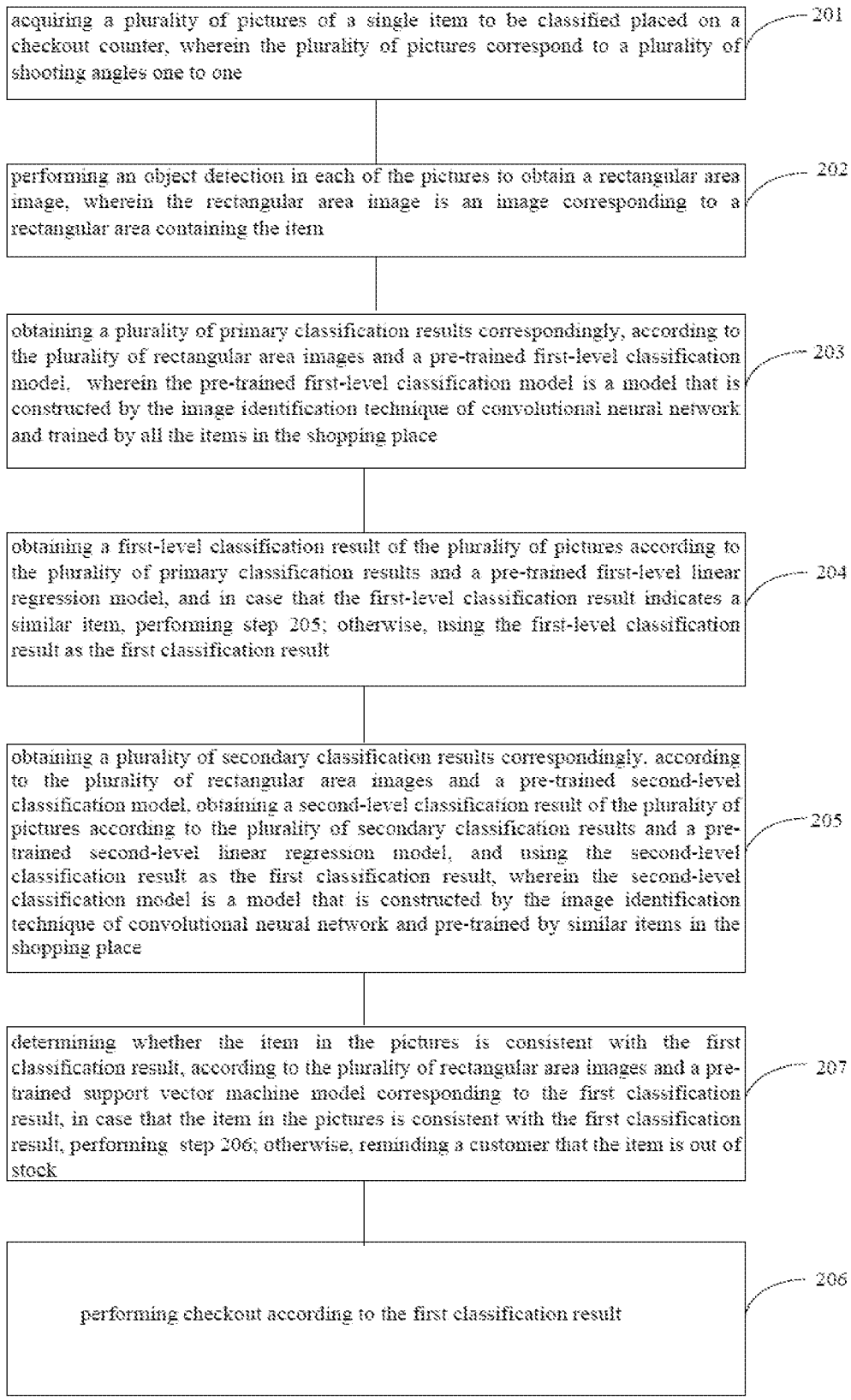
FIG. 3 illustrates a schematic flowchart of a checkout method based on the image identification technique of convolutional neural network provided in another embodiment of the present invention.
Figure 4:
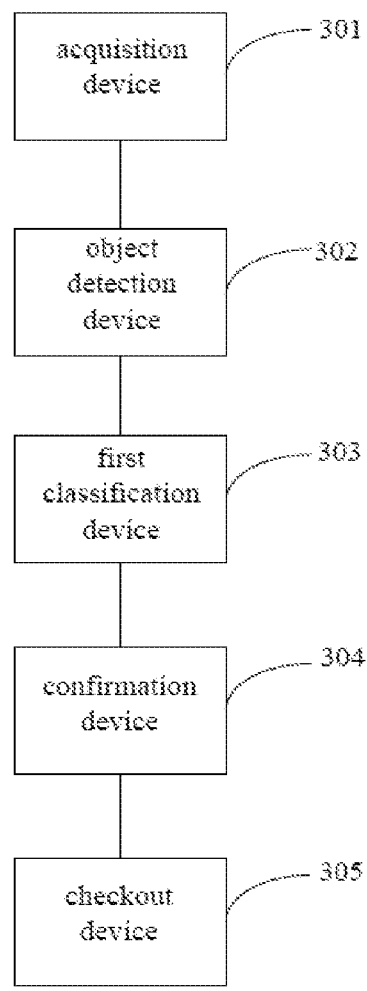
FIG. 4 illustrates a structural schematic diagram of a checkout apparatus based on the image identification technique of convolutional neural network provided in an embodiment of the present invention.

In order to avoid classification error and improve the accuracy of checkout, referring to FIG. 3, before step 206, the method further comprises the following step 207.

In step 207, it is determined whether the item in the pictures is consistent with the first classification result, according to the plurality of rectangular area images and a pre-trained support vector machine model corresponding to the first classification result, if the item in the pictures is consistent with the first classification result, the above step 206 is performed; otherwise, a customer is reminded that the item is out of stock.

Specifically, a machine learning model of the support vector machine (or called as a support vector machine model) is established for each item in the shopping place, i.e., each item has the corresponding support vector machine model, and the model is trained by using the data corresponding to the item in the data set established in step 203. When the first-level classification model is established, an intermediate calculation result that is a vector with a length of 1024, exists. This vector may be viewed as a feature of the picture, thereby establishing a support vector machine model for determining whether the item is an item of a certain category from this vector.

After the first classification result is obtained, the item contained in each rectangular area image is determined by adopting the support vector machine model corresponding to the first classification result to obtain a preliminary determination result, and this preliminary determination result represents whether the item in the picture is consistent with the first classification result. If there are a plurality of rectangular area images, it is preliminarily determined there are a plurality of preliminary determination results. If the number of consistent results in the plurality of preliminary determination results is greater than or equal to a preset threshold, it is determined that the item in this picture is consistent with the first classification result; otherwise, the customer is reminded that the item is out of stock, i.e., no checkout can be performed. If the number of the pictures is five, the preset threshold is three and the five preliminary determination results are sequentially: consistent, consistent, inconsistent, inconsistent, consistent, the number of consistent results is three. Since the number of consistent results is equal to the preset threshold, the support vector machine model determines that the item in the pictures is consistent with the first classification result, it is considered that the above-mentioned classification process is correct, i.e., a correct item is identified, and at this moment the customer can obtain the item through checkout. If the five preliminary determination results are sequentially: inconsistent, inconsistent, inconsistent, inconsistent and consistent, the number of the consistent result is one. Since the number of the consistent result is smaller than the preset threshold, the support vector machine model determines that the item in the pictures is inconsistent with the first classification result, and it is considered that the above-mentioned classification process is unsuccessful, i.e., identification fails, and at this moment voice and/or image is adopted to remind "this item does not exist in the stock and cannot be identified" to remind the customer that the checkout of this item cannot be performed.

One embodiment of the present invention provides the checkout apparatus based on the image identification technique of convolutional neural network, which comprises the acquisition device 301, the object detection device 302, the first classification device 303, the confirmation device 304 and the checkout device 305.

The acquisition device 301 is configured to acquire the plurality of pictures of the single item to be classified placed on the checkout counter, wherein the plurality of pictures correspond to the plurality of shooting angles one to one.

Preferably, the acquisition device 301 is cameras, wherein one camera is disposed a position just above the item to be classified, so as to take pictures of the item downwards from just above to acquire pictures, and four cameras are disposed around the item to be classified, so as to take pictures of the item obliquely downwards.

The object detection device 302 is configured to perform object detection in each of the pictures to obtain the rectangular area image, wherein the rectangular area image is the image corresponding to the rectangular area containing the item.

The first classification device 303 is configured to obtain the plurality of primary classification results according to the plurality of rectangular area images and the pre-trained first-level classification model correspondingly, and obtain the first-level classification result of the plurality of pictures according to the plurality of primary classification results and the pre-trained first-level linear regression model. The first-level classification model is the model that is constructed by the image identification technique of convolutional neural network and trained by all the items in the shopping place.

The confirmation device 304 is configured to use the first-level classification result as the first classification result.

The checkout device 305 is configured to perform checkout according to the first classification result.

The checkout apparatus further comprises the second classification device. In case that the first-level classification result indicates the similar item, the second classification device is configured to obtain the plurality of secondary classification results correspondingly, according to the plurality of rectangular area images and the pre-trained second-level classification model, obtain the second-level classification result of the plurality of pictures according to the plurality of secondary classification results and the pre-trained second-level linear regression model, and use the second-level classification result as the first classification result. The second-level classification model is the model that is constructed by the image identification technique of convolutional neural network and pre-trained by similar items in the shopping place. Correspondingly, in case that the first-level classification result indicates a similar item, the checkout device performs checkout according to the second-level classification result obtained by the second classification device; otherwise, the checkout device performs checkout according to the first-level classification result obtained by the first classification device.

The checkout apparatus further comprises the determination device and the selection module. The determination device is configured to determine whether the item in the pictures is consistent with the first classification result according to the plurality of rectangular area images and a pre-trained support vector machine model corresponding to the first classification result. The selection module is configured to call the checkout device 305, in case that the item in the pictures is consistent with the first classification result; otherwise, remind the customer that the item is out of stock.

It should be noted, with regard to the specific description about the acquisition device 301, reference can be made to the relevant contents in step 101 and step 201 in the above-mentioned embodiments; with regard to the specific description about the object detection device 302, reference can be made to the relevant contents in step 102 and step 203 in the above-mentioned embodiments; with regard to the specific description about the first classification device 303, reference can be made to the relevant contents in step 103 and step 203 in the above-mentioned embodiments; with regard to the specific description about the confirmation device 304, reference can be made to the relevant contents in step 104 and step 204 in the above-mentioned embodiments; with regard to the specific description about the checkout device 305, reference can be made to the relevant content in steps 105 and step 206 in the above-mentioned embodiments; with regard to the specific description about the second classification device, reference can be made to the relevant content in step 205 in the above-mentioned embodiments; and with regard to the specific description about the determination device and the selection device, reference can be made to the relevant content in step 207 in the above-mentioned embodiments, which are thus not repetitively described one by one here.

One embodiment of the present invention provides the checkout apparatus based on the image identification technique of convolutional neural network, which comprises cameras, a processor and a memory.

The cameras are used for acquiring the plurality of pictures of the single item to be classified placed on the checkout counter, wherein the plurality of pictures correspond to the plurality of shooting angles one to one. The memory is configured to record processor-executable instructions. The processor is configured to perform the object detection in each of the pictures to obtain the rectangular area image that is the image corresponding to the rectangular area containing the item, obtain the plurality of primary classification results correspondingly, according to the plurality of rectangular area images and the pre-trained first-level classification model, obtain the first-level classification result of the plurality of pictures according to the plurality of primary classification results and the pre-trained first-level linear regression model, use the first-level classification result as the first classification result, and perform checkout according to the first classification result. The first-level classification model is the model that is constructed by the image identification technique of convolutional neural network and trained by all the items in the shopping place.

The processor is further configured to obtain the plurality of secondary classification results correspondingly, according to the plurality of rectangular area images and the pre-trained second-level classification model, obtain the second-level classification result of the plurality of pictures according to the plurality of secondary classification results and the pre-trained second-level linear regression model, and use the second-level classification result as the first classification result, in case that the first-level classification result indicates the similar item; otherwise, the first-level classification result is used as the first classification result. The second-level classification model is the model that is constructed by the image identification technique of convolutional neural network and pre-trained by the similar items in the shopping place.

The specific process of the method will be described below by buying a bottle of mineral water as an example.

The customer placed a bottle of mineral water on a weighing platform for checkout. When an electronic weighing scale on the weighing detects the change in weight and the weight tends to be stable, data are collected from five cameras, and five pictures are acquired. Firstly, the five pictures are uniformly enlarged or shrunk to a certain preset size, then an object detection model is used for detecting the object in the five pictures. The detection result is to find a rectangular area containing the object in each of the pictures. Then, each rectangular area is uniformly enlarged or shrunk to the certain preset size, and the first-level classification model is used for classifying each rectangular area to obtain a probability that this object belongs to the item of each category. Then, all probability results pass through one first-level linear regression model to obtain the first-level classification result of this object in all item categories. In case that the first-level classification result indicates the item category which needs to be further classified by using the second-level classification model, the corresponding second-level classification model is called to classify each rectangular frame to obtain the probability value that this object belongs to each category, and then the second-level linear regression model is used to obtain the classification result of this object in all item categories. Finally, the support vector machine model (or called as a small model) for this category is used for determining rectangular frames in the five pictures, so as to determine whether this item belongs to this category. If so, this item category is returned; if not, it is considered that this item does not belong to any one item category.

To sum up, the embodiments of the present invention bring out the following beneficial effects.

The items can be accurately identified, so as to facilitate the self-service checkout.

It can be known from common technical knowledge that the present invention can be implemented by other embodiments without departing from the spirit essence or necessary characteristics of the present invention. Therefore, the above-mentioned disclosed embodiments, in all aspects, merely are used for illustration rather than limitation. All changes made in the scope of the present invention or the scope equivalent to the present invention shall fall within the present invention.

What is claimed is:

1. A checkout method based on an image identification technique of convolutional neural network, comprising:
    acquiring a plurality of pictures of a single item to be classified placed on a checkout counter, the plurality of pictures corresponding to a plurality of shooting angles one to one;
    performing object detection in each of the pictures to obtain a rectangular area image, the rectangular area image being an image corresponding to a rectangular area containing the item;
    obtaining a plurality of primary classification results correspondingly, according to a plurality of the rectangular area images and a pre-trained first-level classification model, obtaining a first-level classification result of the plurality of pictures according to the plurality of primary classification results and a pre-trained first-level linear regression model, the first-level classification model being a model that is constructed by the image identification technique of convolutional neural network and trained by all the items in a shopping place;
    using the first-level classification result as a first classification result; and
    performing checkout according to the first classification result.

2. The checkout method according to claim 1, wherein after the obtaining a plurality of primary classification results and before the using the first-level classification result as a first classification result, the checkout method further comprises:
    obtaining a plurality of secondary classification results correspondingly, according to a plurality of the rectangular area images and a pre-trained second-level classification model, obtaining a second-level classification result of the plurality of pictures according to the plurality of secondary classification results and a pre-trained second-level linear regression model, and using the second-level classification result as the first classification result, in case that the first-level classification result indicates a similar item; otherwise performing the first-level classification result as a first classification result, the second-level classification model being a model that is constructed by the image identification technique of convolutional neural network and pre-trained by similar items in the shopping place.

3. The checkout method according to claim 1, wherein after the using the first-level classification result as a first classification result and before the performing checkout according to the first classification result, the checkout method further comprising
    determining whether the item in the pictures is consistent with the first classification result, according to a plurality of the rectangular area images and a pre-trained support vector machine model corresponding to the first classification result, in case that the item in the pictures is consistent with the first classification result, performing the checkout step; otherwise, reminding a customer that the item is out of stock.

4. The checkout method according to claim 1, wherein one camera is disposed in a position just above the item to be classified, so that the item is shot downwards from just above to acquire the picture; and four cameras are disposed around the item to be classified, so that the item is shot obliquely downwards.

5. A checkout apparatus based on an image identification technique of convolutional neural network, comprising:

an acquisition device for acquiring a plurality of pictures of a single item to be classified placed on a checkout counter, the plurality of pictures corresponding to a plurality of shooting angles one to one;

an object detection device for performing object detection in each of the pictures to obtain a rectangular area image, the rectangular area image being an image corresponding to a rectangular area containing the item;

a first classification device for obtaining a plurality of primary classification results correspondingly, according to a plurality of the rectangular area images and a pre-trained first-level classification model, and obtain a first-level classification result of the plurality of pictures according to the plurality of primary classification results and a pre-trained first-level linear regression model, the first-level classification model being a model that is constructed by the image identification technique of convolutional neural network and trained by all the items in the shopping place;

a confirmation device for using the first-level classification result as a first classification result; and a checkout device for performing checkout according to the first classification result.

6. The checkout apparatus according to claim 5, further comprising a second classification device for obtaining a plurality of secondary classification results correspondingly, according to a plurality of the rectangular area images and a pre-trained second-level classification model, obtain a second-level classification result of the plurality of pictures according to the plurality of secondary classification results and a pre-trained second-level linear regression model, and use the second-level classification result as the first classification result, in case that the first-level classification result indicates a similar item, the second-level classification model being a model that is constructed by the image identification technique of convolutional neural network and pre-trained by similar items in the shopping place, and correspondingly, in case that the first-level classification result indicates a similar item, the checkout device performs checkout according to the second-level classification result obtained by the second classification device; otherwise, the checkout device performs checkout according to the first-level classification result obtained by the first classification device.

7. The checkout apparatus according to claim 5, further comprising a determination device for determining whether the item in the pictures is consistent with the first classification result according to a plurality of the rectangular area images and a pre-trained support vector machine model corresponding to the first classification result, and a selection module for calling the checkout device, in case that the item in the pictures is consistent with the first classification result; otherwise, remind a customer that the item is out of stock.

8. The checkout apparatus according to claim 5, wherein the acquisition device includes one camera disposed in a position just above the item to be classified, so that the item is shot downwards from just above to acquire pictures, and four cameras disposed around the item to be classified, so that the item is shot obliquely downwards.

9. A checkout apparatus based on an image identification technique of convolutional neural network, comprising:

cameras configured to acquire a plurality of pictures of a single item to be classified placed on a checkout counter, the plurality of pictures corresponding to a plurality of shooting angles one to one;

a processor; and a memory configured to record processor-executable instructions, the processor configured to perform object detection in each of the pictures to obtain a rectangular area image that is an image corresponding to a rectangular area containing the item, obtain a plurality of primary classification results correspondingly, according to a plurality of the rectangular area images and a pre-trained first-level classification model, obtain a first-level classification result of the plurality of pictures according to the plurality of primary classification results and a pre-trained first-level linear regression model, use the first-level classification result as a first classification result, and perform checkout according to the first classification result, the first-level classification model being a model that is constructed by the image identification technique of convolutional neural network and trained by all the items in the shopping place.

10. The checkout apparatus according to claim 9, wherein the processor is further configured to obtain a plurality of secondary classification results correspondingly, according to a plurality of the rectangular area images and a pre-trained second-level classification model, obtain a second-level classification result of the plurality of pictures according to the plurality of secondary classification results and a pre-trained second-level linear regression model, and use the second-level classification result as the first classification result, in case that the first-level classification result indicates a similar item, the second-level classification model being a model that is constructed by the image identification technique of convolutional neural network and pre-trained by similar items in the shopping place; otherwise, use the first-level classification result as the first classification result.

* * * * *